United States Patent [19]

Strong et al.

[11] Patent Number: 4,871,627

[45] Date of Patent: Oct. 3, 1989

[54] MULTI-CELL METAL/AIR BATTERY

[75] Inventors: David S. Strong, Battersea; John A. Dawson, Amberstview, both of Canada

[73] Assignee: Alcan International Limited, Montreal, Canada

[21] Appl. No.: 111,989

[22] Filed: Oct. 21, 1987

[30] Foreign Application Priority Data

Oct. 22, 1986 [CA] Canada ................................. 521112

[51] Int. Cl.[4] .................... H01M 4/00; H01M 2/36; H01M 2/04
[52] U.S. Cl. ...................................... 429/27; 429/34; 429/72; 429/176
[58] Field of Search ................ 429/27, 34, 72, 175, 429/176

[56] References Cited

U.S. PATENT DOCUMENTS

| | | | |
|---|---|---|---|
| 3,331,704 | 7/1967 | Vickers et al. | 429/34 X |
| 3,378,406 | 4/1968 | Rosansky | 136/86 |
| 3,457,115 | 7/1969 | Kent | 136/86 |
| 3,468,711 | 9/1969 | Jagid et al. | 136/86 |
| 3,592,692 | 7/1971 | Jarabek | 136/86 |
| 3,682,705 | 8/1972 | Petix | 136/86 R |
| 3,682,706 | 8/1972 | Yardney et al. | 136/86 A |
| 4,246,324 | 1/1981 | de Nora et al. | 429/17 |
| 4,369,235 | 1/1983 | Bursell | 429/27 |
| 4,560,626 | 12/1985 | Joy | 429/27 |
| 4,626,482 | 12/1986 | Hamlon et al. | 429/27 |

*Primary Examiner*—Stephen J. Kalafut
*Attorney, Agent, or Firm*—Cooper & Dunham

[57] ABSTRACT

A multi-cell metal/air battery is described having series-connected cells, including a tank for holding a body of liquid electrolyte, and an electrically non-conductive frame carrying a plurality of air cathode assemblies, each cathode assembly having a common air pocket and a pair of cathodes, and a like plurality of anodes respectively juxtaposed to the cathodes outside the air chamber, the air cathode assemblies being removably insertable in the tank and engaging the tank wall, when inserted, so as to divide the tank into a plurality of separate and substantially electrically isolated electrolyte-holding zones each containing one anode-cathode pair. The air cathode assembly may include an air circulation system to keep the air in the pocket fresh. The tank may also include an electrolyte distribution system and a flushing system for flushing the battery without the need to remove the cathodes and anodes from the tank.

22 Claims, 9 Drawing Sheets

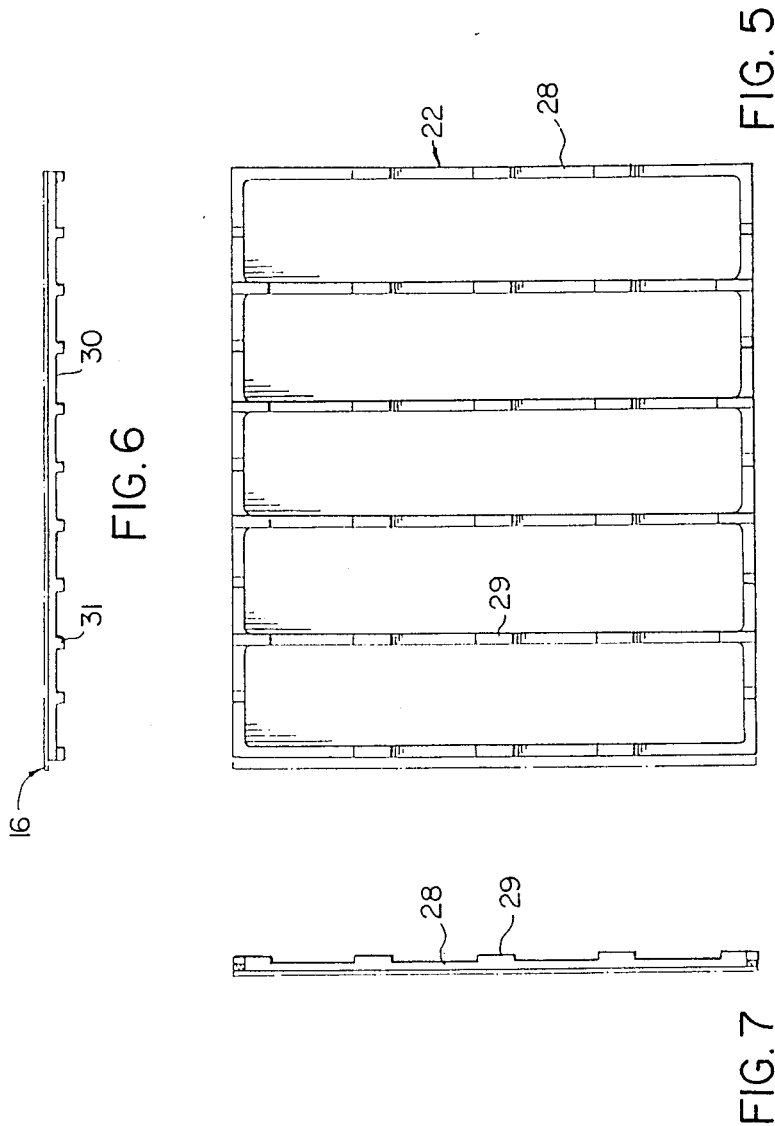

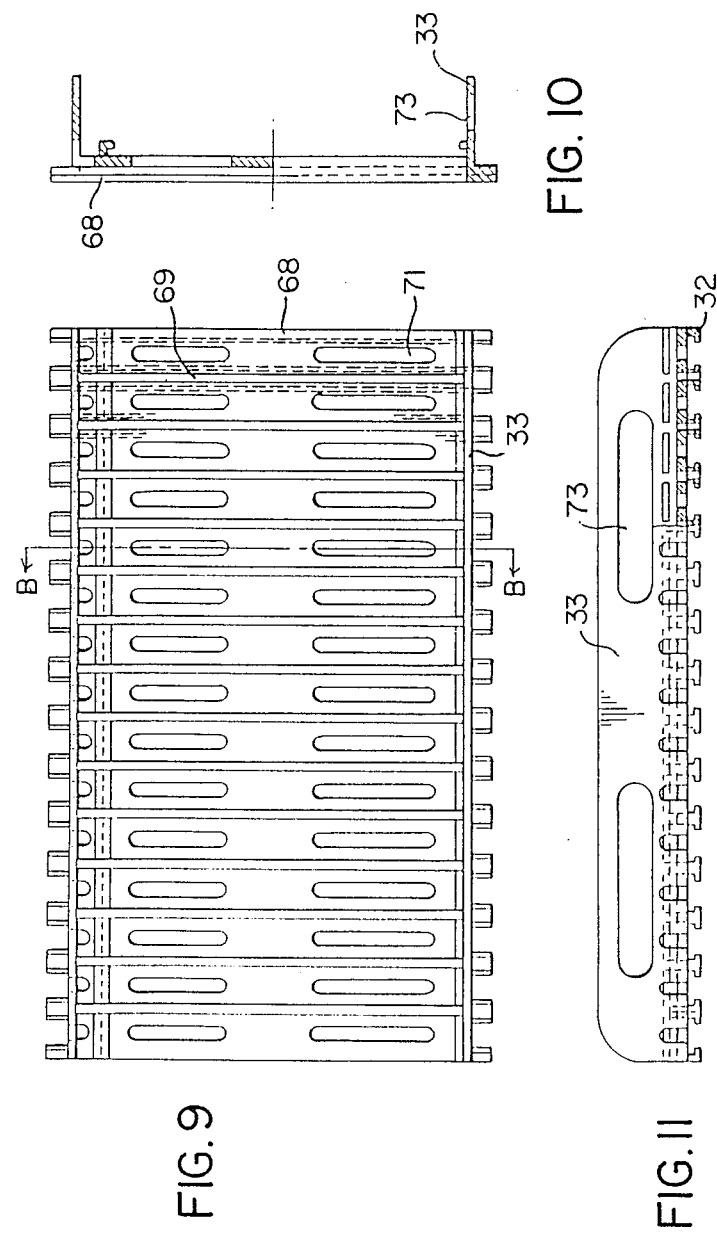

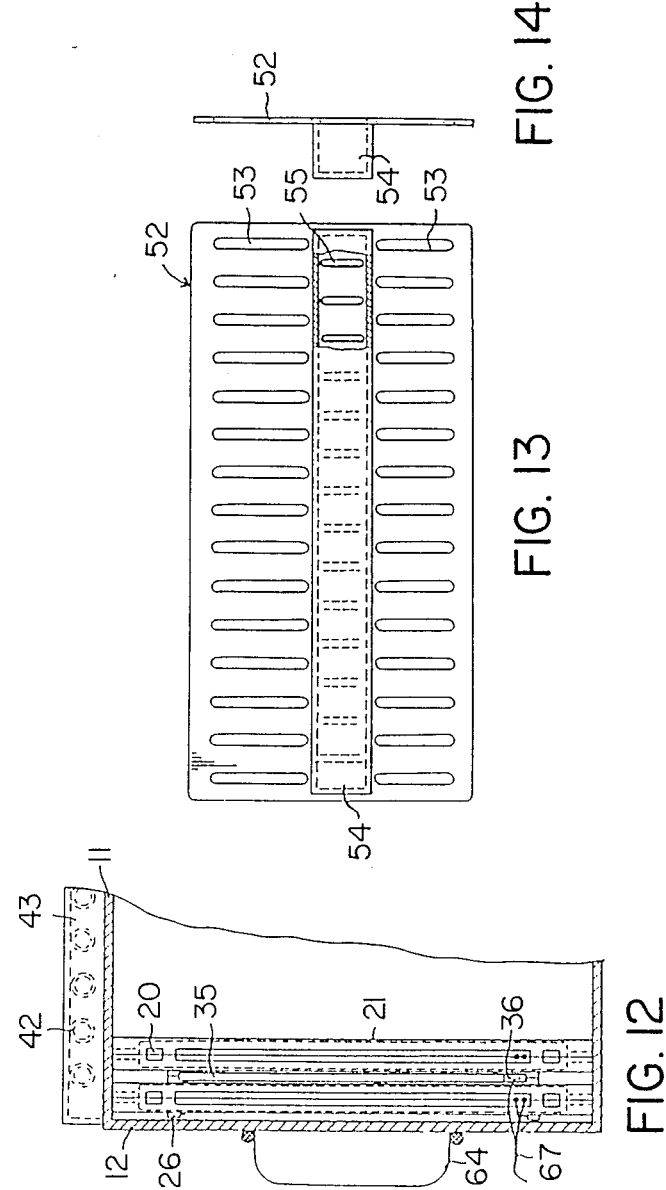

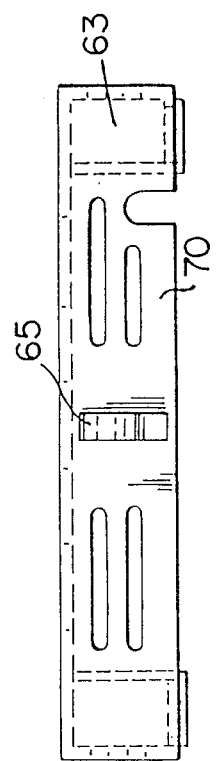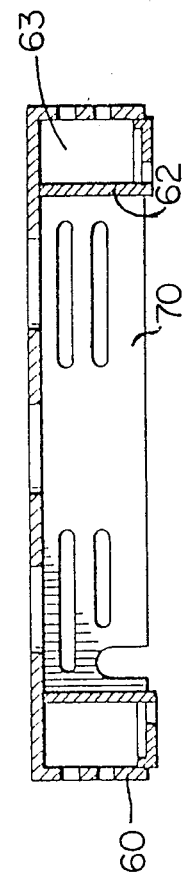

MULTI-CELL METAL/AIR BATTERY

BACKGROUND OF THE INVENTION

The invention relates to metal/air batteries, and particularly such batteries having multiple cells.

Metal/air batteries produce electricity by the electrochemical coupling of a reactive metallic anode to an air cathode through a suitable electrolyte in a cell. The air cathode is typically a sheet-like member, having opposite surfaces respectively exposed to the atmosphere and to the aqueous electrolyte of the cell, in which (during cell operation) oxygen dissociates while metal of the anode oxidizes, providing a usable electric current flow through external circuitry connected between the anode and cathode. The air cathode must be permeable to air but substantially impermeable to aqueous electrolyte, and must incorporate an electrically conductive element to which the external circuitry can be connected. Present-day commercial air cathodes are commonly constituted of active carbon (with or without an added dissociation-promoting catalyst) containing a finely divided hydrophobic polymeric material and incorporating a metal screen as the conductive element. A variety of anode metals have been used or proposed; among them, alloys of aluminum and alloys of magnesium are considered especially advantageous for particular applications, owing to their low cost, light weight, and ability to function as anodes in metal/air batteries using neutral electrolytes such as sea water or other aqueous saline solutions.

A typical aluminum/air cell comprises a body of aqueous electrolyte, a sheet-like air cathode having one surface exposed to the electrolyte and the other surface exposed to air, and an aluminum alloy anode member (e.g. a flat plate) immersed in the electrolyte in facing spaced relation to the first-mentioned cathode surface. The discharge reaction for this cell may be written

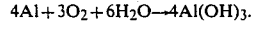
$$4Al + 3O_2 + 6H_2O \rightarrow 4Al(OH)_3.$$

As the reaction proceeds, large amounts of the aluminum hydroxide reaction product forms in the space between anode and cathode and this ultimately interferes with cell operation, necessitating periodic cleaning and electrolyte replacement. It will be appreciated that cleaning and electrolyte replacement become quite complicated when the battery has multiple cells.

The provision of a metal/air battery for emergency situations is proposed in Watakabe, "Magnesium-Air Sea Water Primary Batteries", *Solar Cells,* Vol. II (Cleveland: JEC Press Inc., 1979). This publication shows a "life-torch" with a series-connected twin cell battery of "inside-out" construction, namely a pair of spaced-apart magnesium anodes having a pair of cathodes interposed between them and mutually defining a common air space. Each anode-cathode pair is surrounded by a separate electrolyte space (within a housing) to prevent or minimize electrolytic shunting between the battery cells. As those skilled in the art can appreciate, since the anodes of a pair of series-connected metal-air battery cells are at different potentials, the existence of a current path through the electrolyte between the anodes of the respective cells will cause undesired shunting of current and can significantly impair cell efficiency.

Utilization of a battery constructed in accordance with the above-cited publication would require pouring saline electrolyte into each of the battery inlets. As one can appreciate, the pouring of electrolyte into separate inlet ports can be extremely difficult, especially in the dark. An easier method of filling electrolyte into the batteries is desirable for land applications. Moreover, the device of the above-cited publication is evidently designed for a single use in a marine emergency; for a routine consumer land application, it would be desirable to have a battery that could be repeatedly activated by pouring electrolyte into the cells, and repeatedly deactivated by removing the electrolyte from the cells and cleaning out reaction products formed within the cells, without the hindrance of separate tanks for the two cells.

Also, it would be desirable to retard the accumulation of reaction product in the anode-cathode gap of a metal/air cell or battery, such as an aluminum/air battery, thereby to prolong the period of active use of the cell or battery between cleanings. In this regard, it has heretofore been proposed to provide a relatively wide anode-cathode gap for providing flow of fresh electrolyte around the gap edges, generally parallel to the electrode surfaces; but cell efficiency decreases with increasing anode-cathode distances. Another proposal, set forth in the *Handbook of Batteries and Fuel Cells* (McGraw-Hill, 1984), p. 30–11, is to prevent hydroxide gel formation by employing a caustic electrolyte, but caustic electrolytes are disadvantageous (as compared to saline electrolyte) from the standpoint of convenience, cost, and safety in handling. Thus, it is highly desirable to have a battery capable of functioning with saline electrolyte where the use of caustic may not be desired.

It is an object of the present invention to provide a multi-cell metal/air battery which is compact, easy to operate, easy to clean and re-use and having excellent performance characteristics.

SUMMARY OF THE INVENTION

One aspect of the present invention broadly contemplates the provision of a metal/air battery comprising a tank defining a single continuous reservoir for liquid electrolyte; a plurality of air cathode assemblies, each assembly comprising a pair of air cathodes supported in an electrically non-conductive frame in electrically isolated relation to each other and defining between first surfaces thereof a liquid-tight air chamber open to ambient atmosphere, and said assemblies being removably insertable in the reservoir to expose second cathode surfaces remote from the air chamber to electrolyte therein; a plurality of metal anodes, one for each cathode, disposed for immersion in electrolyte in the reservoir in spaced juxtaposed relation to the cathode second surfaces to constitute therewith a plurality of anode-cathode pairs each electrically coupled by electrolyte; circuit means for connecting the anode-cathode pairs in series to each other and to an external load; and electrically non-conductive means for engaging the cathode assembly frames with the tank, when the frames are inserted in the reservoir, to divide the reservoir into a plurality of separate and substantially electrically isolated electrolyte-holding zones each containing one anode and the cathode second surface juxtaposed thereto, so as to inhibit anode-to-anode current flow through the electrolyte and each electrolyte-holding zone including a refuse collecting zone located below the bottoms of the anode and cathode.

In the assembled battery, the engaging means effectively divides the electrolyte into separate, electrically isolated zones or subreservoirs, one for each anode-cathode pair or cell, inhibiting flow of electric current through the electrolyte between anodes. This substantial prevention of anode-to-anode shunting currents at least largely eliminates the impairment of cell efficiency that would result if such shunting occurred to a significant degree. It is not necessary that the engaging means provide a liquid-tight seal between adjacent zones; the frame-tank engagement at least greatly constricts the cross-sectional area of any electrolyte path for current flow between anodes, increasing the resistance of such paths sufficiently to minimize shunting therethrough. This provides the advantages of a single electrolyte chamber or reservoir and a series battery of two (or more) cells without the drawback of reduced efficiency by anode-to-anode shunting and is described in Hamlen, et al. U.S. Pat. No. 4,626,482, issued Dec. 2, 1986.

The cathode assembly represents an important embodiment of this invention. Depending upon the size of the battery, a number of air cathode assemblies fit into the battery tank and create the individual cells. These assemblies contain an air cathode on each side and when inserted into the electrolyte, create an air pocket on one side of the cathode, the other side being exposed to the electrolyte. Around the edge of the air socket is a fin which fits snugly into the common electrolyte tank and prevents shunt currents between the cells.

In order to control deflection of the cathodes under the hydrostatic pressure of the electrolyte, a support frame assembly is inserted in the air pocket. This is in the form of a grid which prevents deflection of the cathodes while still allowing free air passage through the air cathode assembly.

A simple air pocket in the air cathode assembly may not receive a fresh supply of air and consequently may stagnate. This causes a reduction in oxygen content and results in a gradual voltage drop in the battery. In order to prevent this, according to the present invention air channels may be provided on each side of the air pocket to draw fresh air from the top of the battery and feed this into the bottom of the air pocket. During battery operation, the electrolyte temperature is elevated above ambient, and heat transfer through the air cathodes warms the air in the air cathode assembly pockets. This warm air has a tendency to rise through the top of the battery, thereby drawing fresh air in through the air channels. This form of convection will occur naturally to a certain extent, and in cases where more oxygen is required or more cooling needed, the air may be forced through the system at a greater velocity. To keep the air pocket dry, a wick may be used to draw off water. For instance, a woven nylon wick may extend out through the top of each air pocket.

Also on the air cathode assembly, on each side of the cathode area, are vertical strips or projections and when two or more cathode assemblies are juxtaposed in a battery, the vertical strips of adjacent cassettes contact each other forming a vertical baffle between the active area, i.e. the cathode/anode area, and the outside edge of the battery. Each strip also includes a notched portion extending substantially along the length thereof such that a pair of notched portions form a vertical slot into which a metal anode slides. To prevent the anodes from falling to the bottom of the electrolyte tank, abutments are mounted on the air cathode assemblies upon which the anodes rest. The divider function created by the above baffles is used to control internal electrolyte circulation within the battery.

The top of each air cathode assembly may have outwardly projecting edge strips which slide into a slideway of an air cathode assembly top holder. This top holder allows placement of all air cathode assemblies in a common group properly spaced apart and positioned accordingly. This top holder may include upwardly extending stiffener bars which may be used as handles for lifting the group of air cathode assemblies for insertion into or removal from an electrolyte tank. Besides creating simplicity of assembly, the air cathode top holder allows for replacement of individual air cathode assemblies in case of failure.

While the battery of this invention is particularly useful with a saline electrolyte, other electrolytes such as caustic electrolytes may also be used.

Further features and advantages of the invention will be apparent from the detailed description, together with the accompanying drawings.

BRIEF DESCRIPTION OF THE DRAWINGS

FIG. 5 is a plan view of a spacer for use in the cathode assembly;

FIG. 6 is a side elevation of the spacer of FIG. 5;

FIG. 7 is an end elevation of the spacer of FIG. 5;

FIG. 9 is a plan view of a top support frame;

FIG. 10 is a sectional view of FIG. 9 along line B—B;

FIG. 11 is a side elevation of a support frame for air cathode assemblies;

FIG. 12 is a fragmentary plan section view of the battery of FIG. 1;

FIG. 13 is a plan view of a top slide cover;

FIG. 14 is an end elevation of the side of FIG. 13;

FIG. 18 is an end elevational view of the top cover of FIG. 16; and

FIG. 19 is a sectional view of the top cover along line C—C.

Figure 1:
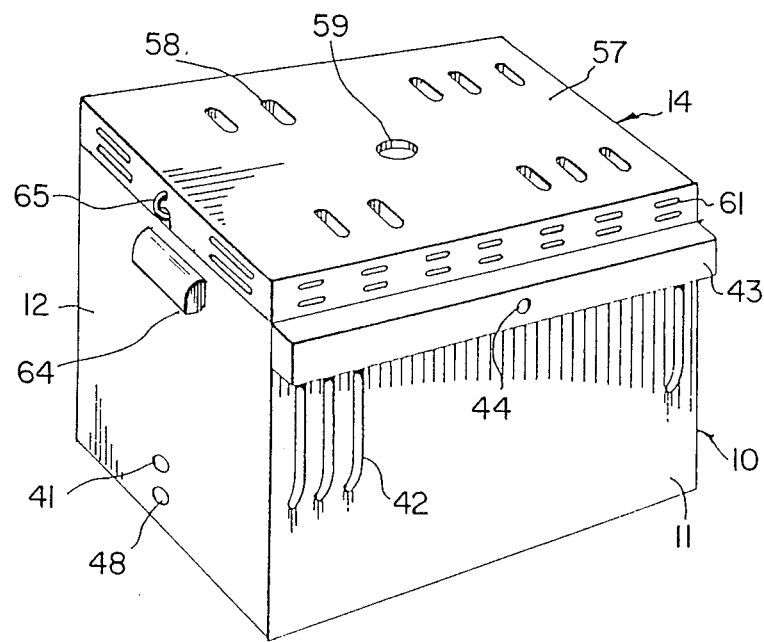
FIG. 1 is a perspective view of a battery embodying the invention.

The basic multi-cell design consists of an open top common electrolyte tank 10 having side walls 11, end walls 12, a recessed bottom wall 13 and a cover 14. Depending upon the size of the battery, a number of air cathode assemblies 15 fit into the tank 10 and create the individual cells.

Figure 2:
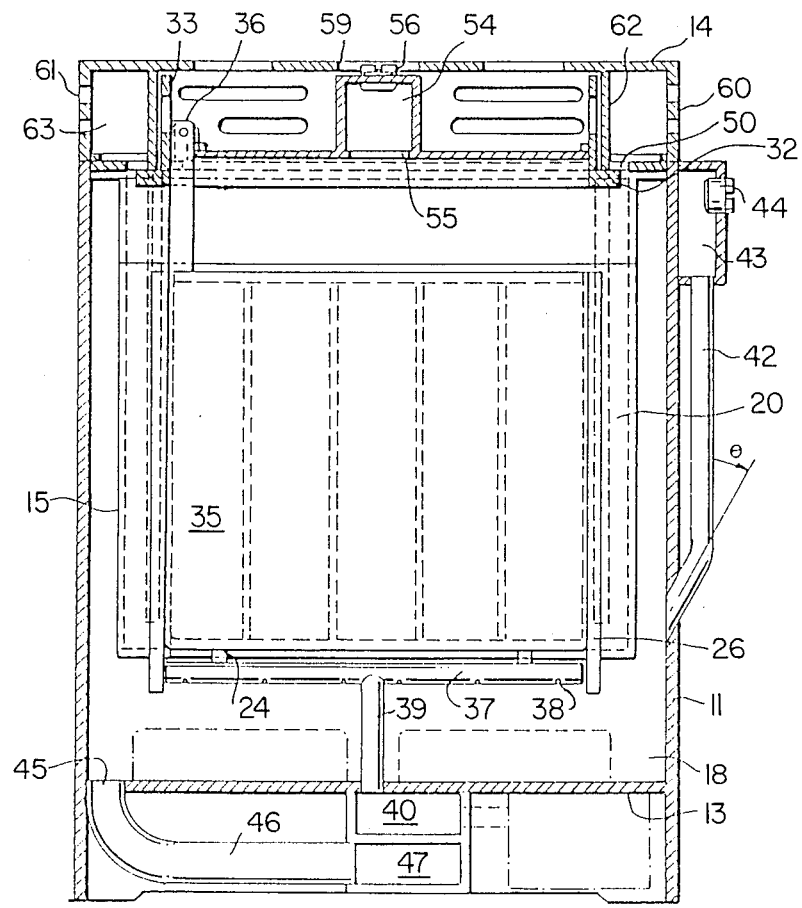
FIG. 2 is an elevational view, in section, of the battery of FIG. 1.
Figures 3, 4:
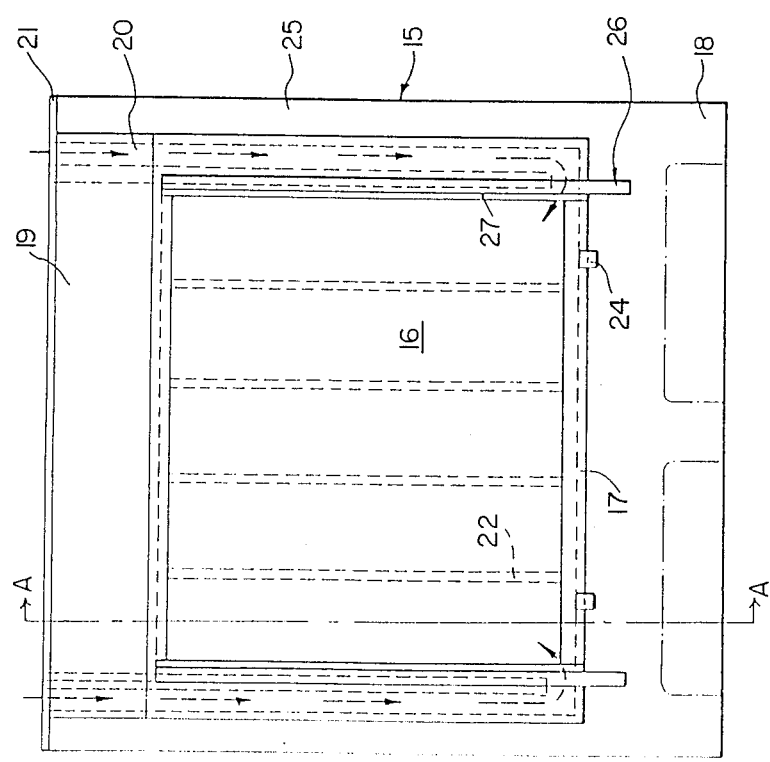
FIG. 3 is a side elevation of a cathode assembly used in the battery of FIGS. 1 and 2.
FIG. 4 is a sectional view of the cathode assembly of FIG. 3 along A—A.

As will be seen from FIGS. 2, 3 and 4, each air cathode assembly 15 includes a pair of spaced apart cathodes 16 mounted in a support frame 17. For construction, each cathode 16 may be assembled within an individual frame as shown in FIG. 4 and the two frames are then joined together to form the complete cathode assembly. Surrounding the sides and bottom of the cathode assembly are side fins 25 and a bottom fin 18. These are designed to fit snugly within the electrolyte tank 10. The top portion 19 of the cathode assembly is in the form of a pair of walls defining therebetween a gap communicating with the air pocket.

Spacers 22 are positioned within the air pocket between the cathodes 16 and these are formed as two mating parts as shown in FIGS. 5, 6 and 7, each half consisting of vertical members 28 with projections 29 and horizontal top and bottom members 30 with projections 31. Each half is assembled with one cathode so that when two cathodes and frames are joined to form the cathode assembly, the projections 29 and 31 of each half contact each other respectively, thereby leaving air gaps as shown in FIG. 4. At the same time, the solid portions formed between the air gaps provided a light weight, rigid stiffener between the cathodes.

Adjacent the cathodes 16 are a pair of air channels 20 extending from the top of the cathode assembly 15 and flow connecting to the bottom of the air pocket between the cathodes. This permits the drawing of fresh air into the air pocket.

Also positioned adjacent the cathodes are a pair of vertical spacer strips 26. Each of these spacer strips includes a recessed groove 27. When the cathode assemblies are juxtaposed in an electrolyte tank 10, the spacer strips contact each other forming vertical barriers between the active areas, i.e. the cathode/anode areas, and the outside edges of the battery. The recesses 27 of a contacting pair of spacer strips together form a slot into which a metal anode slides. The anodes are limited in their movement downward by means of projecting abutments 24 mounted on frame 17.

The top of each air cathode assembly includes outward projections 21 for sliding into a top support holder.

The top support frame can best be seen from FIGS. 9, 10 and 11 and comprises a main body portion 68 down from which extend slideways 32 for receiving the top ends of the air cathode assemblies. Stiffener bars 33 extend upwardly from the support frame and these stiffener bars may include gripping slots 73 for lifting the top holder with the air cathode assemblies installed.

A series of slots 69 are also positioned in the body portion 68 and these slots are positioned to receive the anodes 35 between the air cathode assemblies. Each anode includes a tab 36 which projects through the top of the holder 68 to which electrical connections 67 are made. The air cathode electrical connections can come up through the air pockets in the cathode assemblies, or may be molded into the assembly itself to prevent contact with the electrolyte. The current carrier for the cathode can be either a flexible wire 67 or a relatively solid busbar. Preferably, a solid busbar is insert molded. These cathode busbars then protrude in a pattern with the anode tabs and the required connections are then made by pushing a multi-socket type connector bar into all protruding tabs, making all required connections in one step.

The slots 69 in the cathode holder 68 through which the anodes 35 pass are closed during operation of the battery by sliding a slide plate 52 along the top of the holder 68. The plate can best be seen from FIGS. 13 and 14 and includes a main body portion 52 held by edge tabs 51 and having a projecting manifold 54 extending along the length thereof in a central region. This manifold connects at the bottom to a series of slots 55 and includes a single outlet 56 in the top thereof. These slots 55 communicate with the electrolyte chambers for each cell. During operation, any gases produced in the chemical reaction or used in the process are forced to exit through the slots 55 into the exhaust manifold 54.

Additional slots 53 are provided on each side of manifold 54 and these slots are positioned to communicate with the top ends of the air cathode assemblies providing communication with the air pocket of each cathode assembly, through slots 71 in top holder 68.

Over the top of the tank 10 is the top cover 14 having a top panel 57 with a series of sots 58 extending therethrough and a central opening 59. The cover 14 also includes outer side panels 60, end panels 70 and intermediate panels 62 forming a pair of long thin chambers 63. Air inlet slots 61 are provided in side walls 60 so that cool fresh air may be drawn in through slots 61 and down through air intakes 50 into air channels 20. Warm air from the top of each air cathode air pocket may discharge upwardly through the slots 58 in the cover and exit gases from the electrolyte chambers discharge through manifold 54, outlet 56 and opening 59 in the cover.

The tank 10 may have lifting handles 64 and the cover 14 may be provided with hooks 65 so that the cover may be fixed to the tank by means of clips 66.

The electrolyte tank 10 itself also includes a number of unique features including a liquid electrolyte manifold 43 with an inlet 44 for adding electrolyte to the system. Extending downwardly from the manifold are a series of tubes 42 which pass through the wall of the tank 10 in a lower region inclined at an angle $\theta$ of typically about 30°. Each tube 42 thereby communicates with an electrolyte zone within the tank. Thus, when activating the system by filling it with electrolyte, the manifold 43 provides a common point for adding electrolyte from which the individual cells are filled. During this filling period, and throughout the operation of the battery, this side manifold maintains a uniform electrolyte level in all cells, by virtue of the common attachment for pressure and level equalization. No common electrolyte path can be allowed directly from cell to cell without involving significant shunt current losses. Therefore, relatively long tubes are used between the manifold 43 and the electrolyte tank 10, creating a long path from ell to cell, hence minimizing shunt currents. The point at which these tubes connect to the tank 10 and the angle at which they are mounted is also for a flush cleaning process at the end of the battery operation.

Figure 8:
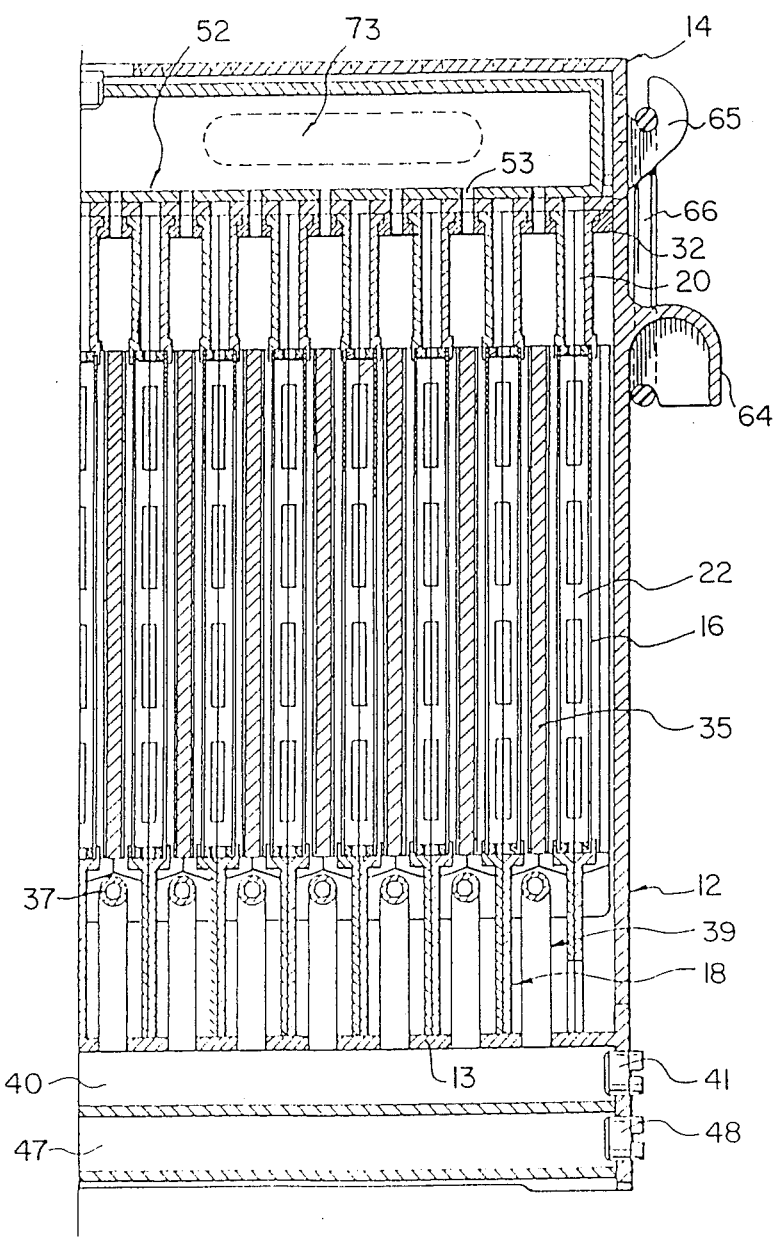
FIG. 8 is a fragmentary side elevational view in section of the battery of FIG. 1.
Figures 15, 16, 17:
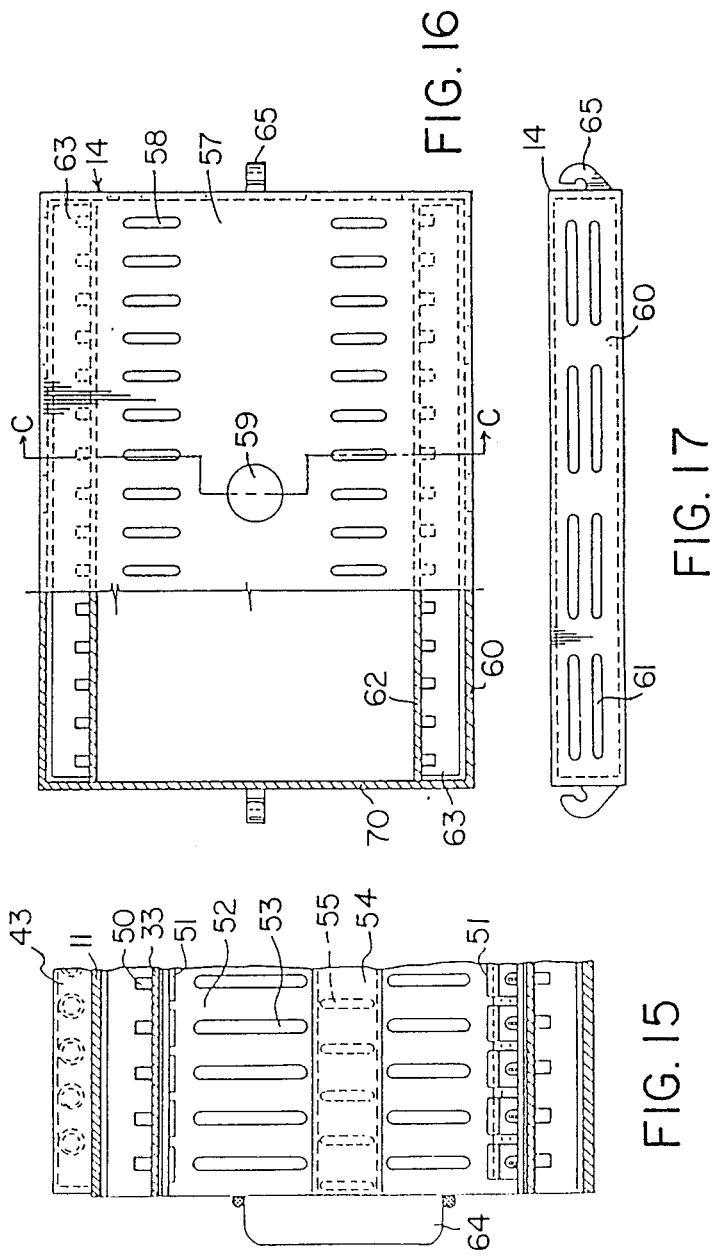
FIG. 15 is a fragmentary plan section view of the top cover in place.
FIG. 16 is a plan view, partially in section, of the top cover.
FIG. 17 is a side elevational view of the top cover of FIG. 16.

Inside tank 10 are a series of T-tubes including a cross tube 37 and an upwardly extending arm 39. As will be seen from FIG. 8, the tubes 37 are positioned directly beneath the anodes 35. The bottom end of each vertical tube 39 communicates with an air manifold 40 having an intake 41 and the cross tube 37 has a series of holes 38. These tubes are used to inject air or other gas into the electrolyte which results in many benefits such as stirring, hydrogen gas dilution and heat removal. The lifting action created by the rising gas in the electrolyte is used to circulate the electrolyte within each individual cell. The vertical spacers 26 on adjoining air cathode assemblies which contact to form baffles are inherent to this process. It can be seen in FIG. 2 that the baffles 26 extend to just below the cross pieces of the air injection tube 37. This ensures that all the gas injected is captured between the baffles and forces that part of the electrolyte to rise. When the bubbles reach the surface of the electrolyte, they escape and are exhausted through the exhaust manifold 54, having diluted the hydrogen gas to a safe level. The lifting of the electrolyte between the baffles creates a spillover circulation down the outside of the baffles. This electrolyte then reaches the bottom of the sump (in the bottom of tank 10), where the velocity decreases substantially. At this point, much of the solid hydroxide by-product, which tends to be in a granular form due to the stirring action, drops to a stagnant area at the bottom of the cell. The electrolyte that recirculates through the cycle tends to be relatively free of solids, although a certain amount of fines stay within the circulating electrolyte throughout the battery operation, resulting in a whitish-colored electrolyte. The removal of the solids in this fashion prevents the build-up of by-product on the electrodes, resulting in a much longer battery life and much easier cleaning.

Beneath the recessed bottom floor 13 of tank 10 is an area which holds a pair of manifolds. The first is air manifold 40 which supplies the air to all of the air injection tubes 37 and the second is a flushing manifold 7. Connected to manifold 47 are a series of tubes 46 which open into the bottom of the electrolyte reservoir through holes 45 in bottom wall 13, one such hole 45 being positioned beneath each electrolyte zone. During operation of the battery, the manifold 47 and tubes 46 fill up with electrolyte and remain stagnant throughout the battery life. However, at the end of the battery life, when the electrolyte is exhausted, a valve may be opened on the end or bottom of the flushing manifold 47, and the exhausted electrolyte ad by-product is flushed out through outlet 48. Again, it should be noted that tubes 47 preferably provide long pathways between cells to prevent shunt currents.

To aid in the cleaning process, once the flushing manifold 47 has been opened, fresh water may be pumped in through electrolyte manifold 43 and forced down each side tube 42 to help flush out the solids. The angle $\theta$ of the lower ends of the side tubes 42 is selected to optimize the angle of impingement in order to be most effective in the cleaning process. In order to ensure that the electrodes are cleaned properly, fresh water may also be back-flushed through the exhaust manifold 54. The slots 55 in the cover plate under the exhaust manifold may be cut in the form of linear nozzles, which will spray the water across most of the electrode area with a relatively high velocity in order to achieve optimum cleaning. The battery cleaning may be carried out without any disassembly of the battery, making this device a simple, self-contained unit. No external pumps, reservoirs or heat exchangers are required, with the exception of a small electrolyte make-up reservoir if the battery is to be operated at relatively high current densities for long periods of time, and a small pump to feed the gas injection manifold if gas injection is used.

We claim:
1. A metal air battery comprising
  (a) a tank defining a single continuous reservoir for liquid electrolyte;
  (b) a plurality of air cathode assemblies removably supported from a top support framework for insertion into the reservoir, each assembly comprising a pair of air cathodes supported in an electrically non-conductive frame in electrically isolated relation to each other and defining between first surfaces thereof a liquid-tight air chamber open to ambient atmosphere, and said assemblies being removably insertable in the reservoir to expose second cathode surfaces remote from the air chamber to electrolyte therein;
  (c) a plurality of metal anodes, one for each cathode assembly, removably carried by said cathode assemblies and disposed for immersion in electrolyte in the reservoir in spaced juxtaposed relation to the cathode second surfaces to constitute therewith a plurality of anode-cathode pairs each electrically coupled by electrolyte;
  (d) circuit means for connecting said anode-cathode pairs in series to each other and to an external load; and
  (e) engaging means includes electrically non-conductive fins projecting from each side of said frame and an electrically non-conductive fin projecting from the bottom of said frame for engaging said tank when the assembly is inserted in the reservoir, to divide the reservoir into a plurality of separate and substantially electrically isolated electrolyte-holding zones each containing one anode and the cathode second surface juxtaposed thereto, so as to inhibit anode-to-anode current flow through the electrolyte, and each electrolyte-holding zone including a refuse collecting zone located below the bottoms of the anode and cathode.

2. A battery as defined in claim 3, wherein each air cathode assembly is slidably mounted in a slideway in said top support framework.

3. A battery as defined in claim 3, wherein each air cathode assembly includes a pair of air channels extending adjacent the sides of each cathode pair from the top of the assembly down to the bottom of the assembly air chamber, for drawing fresh air into the air chamber.

4. A battery as defined in claim 1, wherein said cathode assembly air chamber includes electrically nonconductive spacers for holding the cathodes a uniform distance apart while permitting free flow of air.

5. A battery as defined in claim 1, wherein said anodes are carried by bottom stops on said cathode assemblies.

6. A battery as defined in claim 7, wherein each air cathode assembly includes vertical spacer strips, with spacer strips of adjacent pairs of assemblies engaging each other and grooves in each engaging pair of spacer strips forming therebetween a slot to receive an anode.

7. A battery according to claim 2, wherein the top support framework includes slots through which anodes pass and a slide plate for closing the slots when the anodes are in position between the cathode assemblies.

8. A battery according to claim 7, wherein the slide plate includes a chamber with side walls and a top wall projecting upwardly from the top face thereof and extending along the length thereof and first openings in the slide plate beneath said chamber communicating with said electrolyte-holding zones, whereby any gases produced or used in the process may be discharged through said openings and chamber.

9. A battery according to claim 8, wherein the slide plate also includes second openings in regions not covered by said chamber, said second openings being located to communicate with the tops of said cathode assembly air chambers.

10. A battery according to claim 9, which includes a cover member having outer side walls, end walls, a top wall and a pair of intermediate side walls spaced inwardly from the outer side walls and extending between the end walls to form a pair of edge compartments, said compartments having air intake openings in said outer side walls and the bottoms of said compartments flow communicating with air intake channels extending down the air cathode assemblies, openings in said top wall in the region between said edge compartments flow communicating with said slide plate second openings and an opening in said top wall in the region between said edge compartments flow communicating with said slide plate chamber.

11. A metal air battery comprising
   (a) a tank defining a single continuous reservoir for liquid electrolyte;
   (b) a plurality of air cathode assemblies, each assembly comprising a pair of air cathodes supported in an electrically non-conductive frame in electrically isolated relation to each other and defining between first surfaces thereof a liquid-tight air chamber open to ambient atmosphere, and said assemblies being removably insertable in the reservoir to expose second cathode surfaces remote from the air chamber to electrolyte therein;
   (c) a plurality of metal anodes, one for each cathode assembly, disposed for immersion in electrolyte in the reservoir in spaced juxtaposed relation to the cathode second surfaces to constitute therewith a plurality of anode-cathode pairs each electrically coupled by electrolyte;
   (d) circuit means for connecting said anode-cathode pairs in series to each other and to an external load;
   (e) means for engaging the cathode assembly frames with the tank, when the frames are inserted in the reservoir, to divide the reservoir into a plurality of separate and substantially electrically isolated electrolyte-holding zones each containing one anode and the cathode second surface juxtaposed thereto, so as to inhibit anode-to-anode current flow through the electrolyte, and each electrolyte-holding zone including a refuse collecting zone located below the bottoms of the anode and cathode, and
   (f) bubbler tubes extending horizontally within each electrolyte-holding zone below the anode and cathode, said bubbler tubes serving to inject gas into the electrolyte.

12. A battery as defined in claim 9, wherein each bubbler tube is connected to a gas connector tube extending through the bottom of said tank and connecting to a manifold.

13. A metal air battery comprising
   (a) a tank defining a single continuous reservoir for liquid electrolyte;
   (b) a plurality of air cathode assemblies, each assembly comprising a pair of air cathodes supported in an electrically non-conductive frame in electrically isolated relation to each other and defining between first surfaces thereof a liquid-tight air chamber open to ambient atmosphere, and said assemblies being removably insertable in the reservoir to expose second cathode surfaces remote from the air chamber to electrolyte therein;
   (c) a plurality of metal anodes, one for each cathode assembly, disposed for immersion in electrolyte in the reservoir in spaced juxtaposed relation to the cathode second surfaces to constitute therewith a plurality of anode-cathode pairs each electrically coupled by electrolyte;
   (d) circuit means for connecting said anode-cathode pairs in series to each other and to an external load;
   (e) means for engaging the cathode assembly frames with the tank, when the frames are inserted in the reservoir, to divide the reservoir into a plurality of separate and substantially electrically isolated electrolyte-holding zones each containing one anode and the cathode second surface juxtaposed thereto, so as to inhibit anode-to-anode current flow through the electrolyte, and each electrolyte-holding zone including a refuse collecting zone located below the bottoms of the anode and cathode;
   (f) a discharge outlet in the bottom of said tank within each said electrolyte-holding zone; and
   (g) an opening in a side wall of the tank adjacent each electrolyte-holding zone, said opening being near the bottom end of the anode and cathode and being flow connected to the bottom end of a tube extending upwardly outside the tank, the upper end of which tube is flow connected to an electrolyte reservoir.

14. A battery as defined in claim 13, wherein the bottom end of the tube slopes inwardly toward the tank and the bottom end of the electrolyte reservoir is at least as high as the top ends of the anodes and cathodes.

15. An air cathode assembly for use in a metal air battery comprising:
   (a) a pair of air cathodes supported in an electrically non-conductive frame in electrically isolated relation to each other and defining between first surfaces thereof a liquid-tight air chamber;
   (b) a pair of spaced walls extending between the top of the cathodes and the top of the assembly forming an opening to ambient atmosphere;
   (c) a pair of narrow channels extending down the assembly on each side of the air chamber from the top of the assembly to the region of the bottom of the air chamber for drawing fresh air into the chamber;
   (d) side fins extending from said narrow channels to the side edges of the assembly;
   (e) a bottom fin extending from the bottom of the air chamber to the bottom of the assembly; and
   (f) vertical spacer strips on each side of the air chamber.

16. An air cathode assembly according to claim 15, which includes a spacer grid within the air chamber for holding the cathodes a uniform distance apart while permitting free flow of air.

17. An air cathode assembly according to claim 15, which includes projecting abutments adjacent the bottoms of the cathodes for holding anodes.

18. An air cathode assembly according to claim 17, wherein each vertical spacer strip includes a recessed portion, whereby a mating pair of recessed portions form a slot for receiving an anode.

19. An air cathode assembly according to claim 18, wherein the top edge of the assembly has a pair of outwardly projecting flanges for slidably mounting in a slideway of a top support frame.

20. A tank for a metal air battery comprising a rectangular reservoir for liquid electrolyte, said reservoir including a pair of side wall, a pair of end walls, a recessed bottom wall, a plurality of openings in one said side walls in a lower region of said reservoir, each said opening being flow connected to the bottom end of a side tube extending up said side wall and said tube being flow connected at the top end thereof to a liquid electrolyte manifold mounted on an upper region of said side wall, a plurality discharge openings in said bottom wall adjacent the side wall removed from said side tubes, each discharge opening being flow connected to one end of a tube the other end of which is flow connected to a discharge manifold mounted beneath said recessed bottom wall.

21. A tank according to claim 20, wherein the lower end of each side tube is inclined inwardly toward the tank wall.

22. A tank according to claim 21, which includes a second manifold beneath the recessed bottom wall and extending along the length thereof, a plurality of openings in said bottom wall above said manifold, a short tube member extending upwardly from each said opening and a perforated tube mounted perpendicular to said short tube member, whereby air may be forced from said manifold through said tubes and perforations.

* * * * *